United States Patent [19]

Noguchi

[11] Patent Number: 4,601,114

[45] Date of Patent: Jul. 22, 1986

[54] METHOD AND APPARATUS FOR DEMOISTURIZING AND HEATING DRYING AIR FOR DRYING SYNTHETIC PLASTIC MATERIAL

[75] Inventor: Haruo Noguchi, Yokohama, Japan

[73] Assignee: Colortronic Co., Ltd., Tokyo, Japan

[21] Appl. No.: 705,316

[22] Filed: Feb. 25, 1985

[30] Foreign Application Priority Data

Feb. 25, 1984 [JP] Japan .................. 59-35002

[51] Int. Cl.⁴ .............................. F26B 3/04
[52] U.S. Cl. .................................. 34/27; 34/32; 34/62; 34/80; 55/179
[58] Field of Search ............ 34/80, 32, 27, 62; 55/59, 179, 180

[56] References Cited

U.S. PATENT DOCUMENTS

| | | | |
|---|---|---|---|
| 2,434,419 | 1/1948 | Laughlin et al. | 34/80 |
| 4,306,889 | 12/1981 | Schafer et al. | 55/179 |
| 4,512,781 | 4/1985 | Caralli et al. | 55/179 |
| 4,516,988 | 5/1985 | Winter | 55/59 |

Primary Examiner—Larry I. Schwartz
Attorney, Agent, or Firm—Staas & Halsey

[57] ABSTRACT

Drying air to be circulated for drying plastic material is demoistured and heated by one of two separate adsorbing treatment units. When one of the two units is engaged in adsorbing treatment of the drying air, the other unit engages in a desorbing treatment and cooling treatment for regenerating the adsorbent by the use of desorbing high temperature air passing through the unit in a direction reverse to that in which the drying air is passed through the unit. The cooling treatment of the adsorbent after the desorbing treatment is accomplished by the use of a part of the drying air.

15 Claims, 17 Drawing Figures

METHOD AND APPARATUS FOR DEMOISTURIZING AND HEATING DRYING AIR FOR DRYING SYNTHETIC PLASTIC MATERIAL

BACKGROUND OF THE INVENTION

1. Field of the Invention

The present invention relates to a method and apparatus for demoisturizing air, more particularly to a method and apparatus for adsorbing humidity from and heating drying air circulated for drying a synthetic plastic material to be molded by a molding machine. The apparatus is adapted principally to be used in association with a molding machine, such as an injection molding machine, a blow molding machine and an extrusion molding machine.

2. Description of the Related Art

Many synthetic plastic materials absorb moisture and thus will normally contain anywhere from a fraction of a percent to a few percent of water. When a synthetic plastic material is molded by a molding machine, it is usually necessary to remove the water component from the plastic material prior to supply into the molding machine.

Accordingly, a drying hopper is conventionally used to first dry the synthetic plastic material. Hot air or hot demoisturized air is passed from a lower end of the drying hopper containing the moist plastic material, adjacent to a hopper outlet for delivering the dried plastic material, to an upper end adjacent to a hopper inlet for receiving supplementary moist plastic material.

Whether hot air or hot demoisturized air is used as the drying air is determined based on the properties of the plastic material, i.e., equilibrium water content rate under a predetermined temperature. There are several kinds of plastic material, such as polyamide and polyethylene terephthalate, which need to be dried by hot demoisturized air. The supply of the hot demoisturized air to the drying hopper is conventionally conducted by an air-adsorption treatment apparatus which includes an adsorption treatment means retaining therein an adsorbent or combination of adsorbents. The air-adsorption treatment apparatus receives the drying air returned from the upper end of the drying hopper to adsorb moisture from the returned drying air an by adsorption treatment chamber. The apparatus heats up the drying air to a required hot temperature and then resupplies the hot demoisturized drying air into the lower end of the drying hopper. That is, the drying air is repeatedly circulated through the drying hopper and the air-adsorption treatment apparatus.

At this stage, since the drying air retains a higher than normal temperature even when it is discharged from the upper end of the drying hopper after drying of the synthetic plastic material, it is conventionally preferred to employ synthetic zeolite as an adsorbent, which has an excellent adsorbing property at a relatively high temperature range. The adsorbing property of the adsorbent, however, gradually deteriorates with the progress of the adsorbing treatment. This is because the adsorbent is gradually humidified with moisture.

Therefore, the air-adsorption treatment apparatus must regenerate the adsorbent humidified with moisture during the treatment of the drying air. Regeneration of the moisture-saturated adsorbent is carried out by desorbing moisture from the adsorbent by the employment of hot air introduced from the atmosphere through a blower and a heater and then by cooling the adsorbent by the employment of cool air, also introduced from the atmosphere, until the adsorbent becomes cold enough for recovering the adsorbability thereof.

One example of the above-mentioned conventional air-adsorption treatment apparatus is disclosed in U.S. Pat. No. 3,972,129 to Graff. However, the apparatus of Graff has to take into account that, while the regeneration of the adsorbent is carried out, the drying air must be prevented from flowing through the drying hopper containing therein synthetic plastic material to be delivered to an injection molding machine. That is, the air-adsorption treatment cycle is interrupted.

Moreover, the apparatus of this example requires a special blower which can be operated in opposite directions in order to realize alternative air-adsorption treatment and regeneration of the adsorbent in a single circuit.

There are, however, some cases where interruption of the air-adsorption treatment cycle is unfavorable. Further, in the regeneration cycle, the adsorbent dried by the hot air is exposed to cooling air introduced from the atmosphere. As a result, the dried adsorbent might be moistened by humidity contained in the cooling air and, accordingly, loses a part of its adsorbability.

Figure 1:
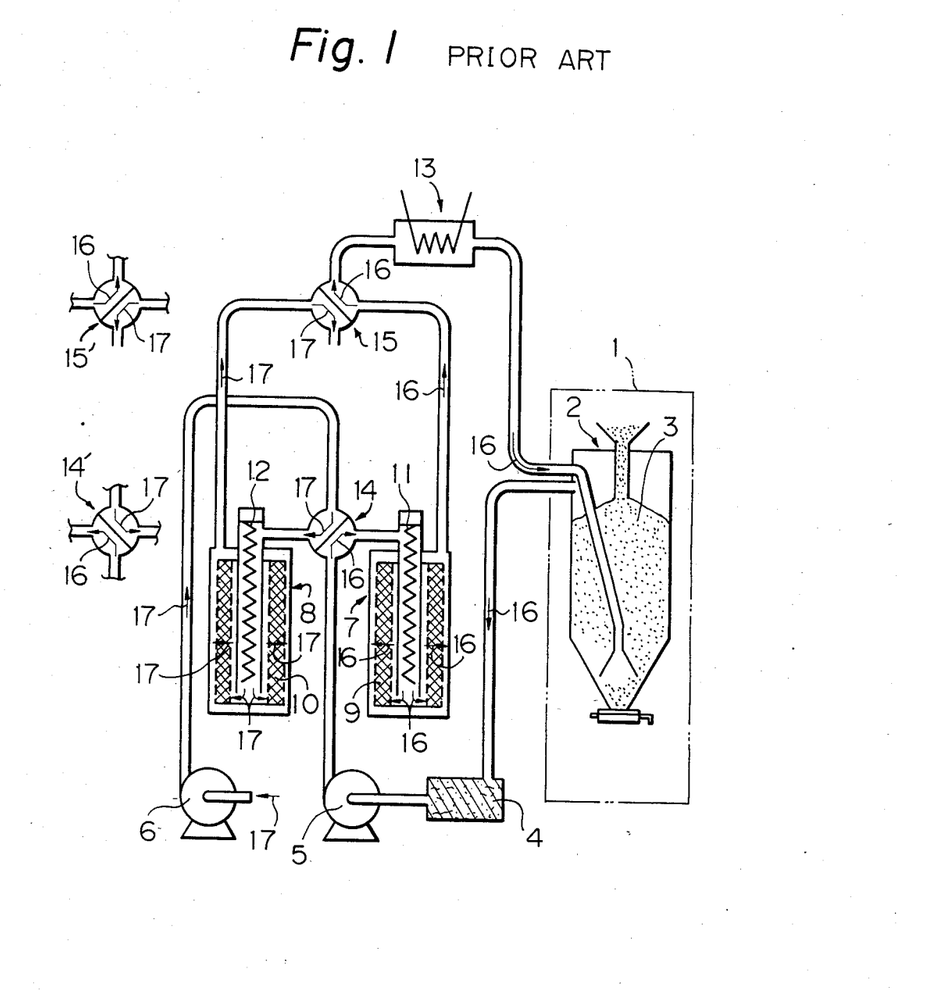
FIG. 1 is a diagrammatic view of an apparatus for demoisturizing and heating drying air for drying synthetic plastic material held in a drying hopper according to a prior art.

Another example of the conventional air-adsorption treatment apparatus is illustrated in FIG. 1, in which two adsorbent towers are alternatively operated so as to continually demoisturize and heat drying air for drying synthetic plastic material in a drying hopper without any interruption.

Referring to FIG. 1, a drying hopper section enclosed by the broken line designated by reference numeral 1 includes a drying hopper 2 which can store synthetic plastic granulate or pellets 3 to be supplied to a molding machine (not illustrated in FIG. 1). The air-adsorption treatment apparatus is arranged in association with the drying hopper section 1 and includes two adsorbing towers 7 and 8 containing therein adsorbents 9 and 10, respectively, and also accommodating respective heaters 11 and 12 for regenerating or desorbing hot air of, for example, 250° C. through 300° C.

The apparatus also includes air circuits for alternatively connecting the two adsorbing towers 7 and 8 to the drying hopper 2, a filter 4, a blower 5 for propelling drying air having returned from the drying hopper 2 via the filter 4 toward one of the adsorbing towers 7 and 8, a blower 6 for introducing air from the atmosphere for the desorbing purpose, a heater 13 for heating up the drying air to a required temperature before entering the drying hopper, and two automatically operated valves 14 and 15 in the form of four-way change-over valves. The changed-over states of the two valves 14 and 15 are also illustrated and designated by reference numerals 14' and 15', respectively. Arrows 16 in FIG. 1 indicate the flow of the drying air for drying the plastic pellet 3. The drying air returning from an upper end of the drying hopper 2 flows through the cleaning filter 4 into the blower 5 where it is propelled so as to flow toward the automatically operated valve 14. Subsequently, the drying air passing through the valve 14 flows into the adsorbing tower 7, via the heater 11, which is not energized during the adsorbing cycle. Within the adsorbing tower 7, the drying air humidified with moisture removed from the plastic pellets 3 is subjected to adsorbing treatment by the adsorbent 9. Thereafter, the drying air flows, via the valve 15, into the heater 13 where it is heated up to a temperature ready for drying the plastic pellets 3 and then enters the drying hopper 2.

In the same period of time as the abovementioned adsorbing cycle, the other adsorbing tower 8 is in a regeneration cycle. Arrows 17 indicate the flow of air introduced from the atmosphere by the blower 6. The introduced air flows via the automatically operated valve 14 into the heater 12, which is in energization, so that it is heated and becomes hot air. The hot air subsequently passes through the adsorbent 10 so as to desorb moisture from the adsorbent 10. The air then flows out of the circuit into the atmosphere via the automatically operated valve 15. After a predetermined period of time, the heater 12 is deenergized. Therefore, air introduced by the blower 6 is not heated and acts so as to cool the adsorbent 10 in the adsorbing tower 8 until the adsorbent 10 is regenerated. When the desorbing and cooling operations to regenerate the adsorbent 10 are completed, the two automatically operated valves 14 and 15 are changed over to the positions 14' and 15', respectively. Accordingly, the adsorbing tower 7 is now subjected to the regenerating cycle, while the adsorbing tower 8 undertakes the adsorbing cycle for demoisturizing the drying air.

With the air-adsorption treatment apparatus of FIG. 1, it should be noted that each of the adsorbing towers 7 and 8 is passed by the regenerating air introduced from the atmosphere in the same direction as the drying air. It is, however, necessary for the drying air to be demoisturized by the adsorbing tower 7 or 8 to the extent that the dew point of the drying air is low enough (for example, $-40°$ through $-60°$ C.) for drying synthetic resin material when the air leaves the adsorbing tower 7 or 8. Accordingly, the outlet side of each of the adsorbing towers 7 and 8 must be more adsorbable than the inlet side of each of the towers 7 and 8. Taking this fact into consideration, the regenerating hot air should pass through the adsorbing tower 7 and 8 in the direction reverse to that in which the drying air flows.

Further, in the apparatus of FIG. 1, cooling of the adsorbing towers 7 and 8 must be carried out by air that is introduced from the atmosphere by the blower 6. The cooling air unavoidably contains humidity that may adversely affect the adsorbing towers 7 and 8. In addition, during the cooling of the adsorbing towers 7 and 8, the humid cooling air per se is subjected to the adsorbing treatment, which generates latent heat in the towers 7 and 8. Such latent heat has an additional adverse effect on the cooling of the adsorbing towers 7 and 8. Moreover, the cooling air removes heat from the adsorbing towers 7 and 8 and dissipates the heat into the atmosphere. That is, waste of heat energy occurs. Consequently, the air-adsorption treatment apparatus of FIG. 1 is imperfect from the viewpoint of industrial efficiency.

SUMMARY OF THE INVENTION

An object of the present invention is to eliminate the above-mentioned defects of the conventional air-adsorption treatment apparatus.

Another object of the present invention is to provide a method of and apparatus for demoisturizing air for use in drying synthetic plastic material, which are capable of satisfying the three requirements, set forth below, for the use of an absorbent.

(i) The desorbing hot air for regenerating the adsorbent is passed through adsorbing means in the direction reverse to that in which drying air is passed.

(ii) Less moist air compared with air coming from the atmosphere is used as cooling air, and is passed through adsorbing means in a direction similar to that in which the drying air is passed. (iii) Waste of heat energy removed from the adsorbing means by the cooling air during regeneration of the adsorbent can be reclaimed and reused for drying synthetic plastic material.

A further object of the present invention is to provide an apparatus for demoisturizing air for use in drying synthetic plastic material, which can be practically used in industry.

In accordance with one aspect of the present invention, there is provided a method of demoisturizing and heating drying air to be circulated for drying synthetic plastic material held in a supply container, such as a drying hopper. The method includes in combination the steps of arranging two separate adsorbing treatment units having a moisture adsorbing column filled with adsorbent, respectively; connecting alternatively one of the two separate adsorbing treatment units to the supply container for a first predetermined period of time; circulating the drying air through the supply container and the moisture adsorbing column of the one of the two separate adsorbing treatment units for the first predetermined period of time, so that the drying air which has demoisturized the synthetic plastic material is subjected to adsorption treatment by the moisture adsorbing column; passing heated air through the other of the two separate adsorbing treatment units for a second predetermined period of time shorter than the first predetermined period of time during the above-mentioned circulating step so as to desorb moisture from the moisture adsorbing column of the other of the two separate adsorbing treatment units; passing subsequently a part of the drying air, which has passed through the supply container and has demoisturized the synthetic plastic material, through the other of the two separate adsorbing treatment units for a third predetermined period of time by the time when the above-mentioned circulating step is completed, so that the moisture adsorbing column of the other adsorbing treatment is cooled by the part of the drying air after the above-mentioned flowing step of the heated air; and mixing the part of the drying air which has passed through the other adsorbing treatment unit with the drying air which has been subjected to adsorption treatment by the moisture adsorbing column of the one of the two separate adsorbing treatment units.

In accordance with another aspect of the present invention, there is provided a demoisturizing and heating apparatus for carrying out the above-defined method. The apparatus includes, in combination, a first adsorbing treatment unit including a first fixed adsorbing column filled with adsorbent and a first heating unit; a second adsorbing treatment unit, including a second fixed adsorbing column filled with adsorbent and a second heating unit; a first blower unit connected to an air outlet of the drying hopper for promoting the drying air to be discharged from the drying hopper and to flow toward the first and second adsorbing treatment units in a first direction; a second blower unit connectable to one of the first and second desorbing treatment units for supplying air from the atmosphere to one of the first and second adsorbing treatment units; a first valve assembly capable of taking first through third positions in a cyclic sequence, the first position permitting the drying air from the first blower unit to be circulated to an air inlet of the drying hopper through the first adsorbing treatment unit in which the drying air is demoisturized by the first adsorbing column and heated by the first heater, the second position permitting the air from the second blower unit to pass through the first adsorbing treatment unit while desorbing moisture from the first adsorbing column, and the third position permitting a part of the drying air from the first blower unit to be circulated toward the air inlet of the drying hopper through the first adsorbing treatment unit while cooling the first adsorbing column and the first heating unit; a second valve assembly capable of taking first through third positions in a cyclic sequence, the first position permitting the drying air from the first blower unit to be circulated to the air inlet of the drying hopper through the second adsorbing treatment unit in which the drying air is demoisturized by the second adsorbing column and heated by the heater, the second position permitting the air from the second blower unit to pass through the second adsorbing treatment unit while desorbing moisture from the second adsorbing column, and the third position permitting a part of the drying air from the first blower unit to be circulated toward the air inlet of the drying hopper through the second adsorbing treatment unit while cooling the second adsorbing column and the second heating unit; and a control unit for controlling operation sequence of the first and second valve assemblies in such a manner that while one of the first and second valve assemblies is taking the first position thereof, the other of the first and second valve assemblies takes the second and third positions thereof.

BRIEF DESCRIPTION OF THE DRAWINGS

Other objects, features, and advantages of the present invention will become more apparent from the ensuing description of the preferred embodiments, with reference made to the accompanying drawings, wherein.

DESCRIPTION OF THE PREFERRED EMBODIMENTS

Figure 2:
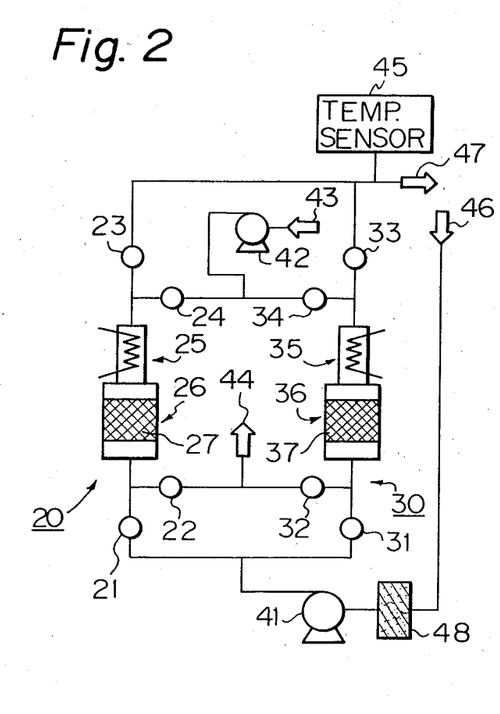
FIG. 2 is a diagrammatic view of an apparatus for demoisturizing and heating drying air for drying synthetic plastic material according to an embodiment of the present invention.

Referring to FIG. 2, which illustrates a first embodiment of the present invention, an apparatus for demoisturizing and heating drying air includes two separate adsorbing treatment units 20 and 30, which are alternatively connectable to an air return port 46 from which drying air humidified with moisture of synthetic plastic material (granulate or pellet) is discharged and an air supply port 47 through which drying air having been demoisturized and heated enters the synthetic plastic material. The adsorbing treatment unit 20 includes a heater 25, such as an electrically powered heater, and an adsorbing column 26 filled with adsorbent 27, for example, regenerable synthetic zeolite. The adsorbing treatment unit 20 is provided with automatically operated valves 21 through 24 which are able to take three positions, i.e., a fully open position, a closed position, and a partly open position. The adsorbing treatment unit 30 includes a heater 35 similar to the heater 25 and an adsorbing column 36 filled with adsorbent 37, for example, regenerable synthetic zeolite. The adsorbing treatment unit 30 is also provided with automatically operated valves 31 through 34 similar to the valves 21 through 24.

The demoisturizing and heating apparatus also includes a blower 41 for propelling the drying air humidified with moisture to be delivered from the air return port 46 via a filter 48. The moisturized drying air is commonly blown toward the units 20 and 30. The apparatus moreover includes a blower 42 which sucks air of the atmosphere through an air inlet 43. The sucked air is commonly blown toward the units 20 and 30. A temperature sensor 45 is arranged adjacent to the air supply port 47 for detecting the temperature of the demoisturized and heated air at an entrance of a drying hopper (not shown). The drying hopper, which is used for supplying synthetic plastic material to a molding machine (not shown), has an air entrance connected to the air supply port 47 by an appropriate piping and an air exit connected to the air return port 46 by an appropriate piping. An air outlet 44 opens toward the atmosphere.

The operation of the demoisturizing and heating apparatus will now be described with reference to FIGS. 3 through 5, in which hollow circles indicate valves in the fully open positions thereof, filled circles indicate valves in the closed positions thereof, and half filled circles indicate valves in the partly open positions thereof.

Figure 3:
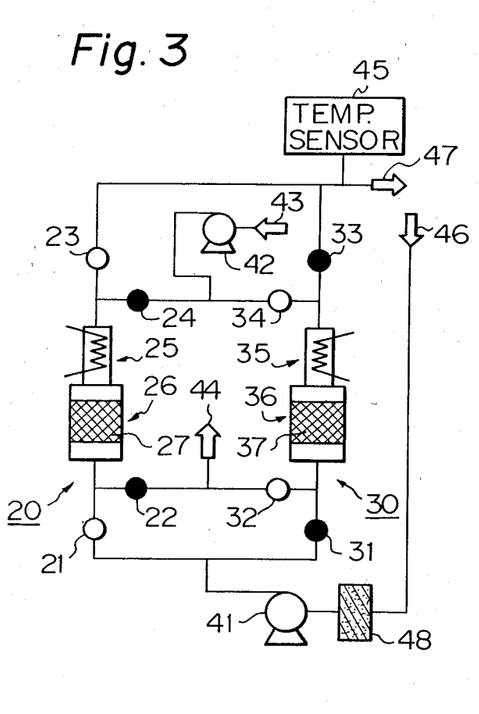
FIGS. 3 through 5 are diagrammatic views illustrating the operation of the apparatus of FIG. 2.

FIG. 3 illustrates one operating condition of the demoisturizing and heating apparatus, in which the adsorbing treatment unit 20 undertakes adsorbing treatment of the drying air humidified with moisture, while the adsorbing treatment unit 30 is subjected to desorbing treatment of the regenerable adsorbent 37 of the adsorbing column 36.

The drying air humidified with moisture and discharged from the drying hopper is promoted by the blower 41 so as to flow through the return port 46, the filter 48, and the automatically operated valve 21 and to enter into the adsorbing treatment unit 20. In the unit 20, the drying air is demoisturized by the absorbing column 26 so that dew point of the drying air is lowered to the extent of, for example, $-40°$ C. through $-60°$ C. The demoisturized drying air is subsequently heated by the heater 25 to a requisite temperature usually selected from a temperature range of, for example, 80° C. through 160° C. The requisite temperature is determined depending on the property of the synthetic plastic material. The drying air having passed through the heater 25 flows toward the air outlet 47 via the automatically operated valve 23. The temperature sensor 45 detects the temperature of the drying air in order to precisely control the thermal output of the heater 25 while the heater 25 is heating the drying air.

With the adsorbing treatment unit 30 of FIG. 3, the air of the atmosphere is sucked by the blower 42 from the air inlet 43 and is then sent into the heater 35 via the automatically operated valve 34. The atmospheric air is heated by the heater 35 to a high temperature within a range of, for example, 250° C. through 300° C. The heated air immediately enters into the adsorbing column 36 and desorbs, from the adsorbent 37, the moisture which has been adsorbed by the adsorbent 37 during the previous adsorbing treatment cycle of the adsorbing treatment unit 30. The air having passed through the adsorbing column 36 is discharged into the atmosphere via the automatically operated valve 32 and the air outlet 44. At this stage, it should be understood that since the heater 35 is disposed adjacent to the column 36, the heat energy of the heater 35 is utilized for desorbing treatment without any appreciable loss. It should further be understood that since the temperature of the desorbing air does not need to be an exact temperature, i.e., since the temperature of the desorbing air can be an approximate temperature within a predetermined temperature range, such as the above-mentioned temperature range of 250° C. through 300° C., the heater 35 does not have to be precisely controlled while the adsorbing treatment unit 30 is subjected to the desorbing operation. Therefore, the heater 35 is operated at its rated output, and temperature control of the air heated by the heater is achieved in such a conventional manner that the amount of the air sucked by the blower 42 from the atmosphere is adjusted by an appropriate manually regulated valve (not illustrated) arranged on either the upstream or downstream side of the blower 42.

The desorbing treatment to which the adsorbing treatment unit 30 is subjected may last until the temperature of the air sensed by an appropriate temperature sensor disposed adjacent to the air outlet 47 reaches a predetermined value. Alternately, a suitable timer unit, such as a conventional electric timer, may be used for determining the completion of the desorbing treatment.

After completion of the above-mentioned desorbing treatment, the adsorbing treatment unit 30 is subsequently subjected to a cooling treatment while the adsorbing treatment unit 20 is still engaged in the adsorbing treatment. That is, the blower 42 is stopped, and the automatically operated valves 31 through 34 are changed over to the positions as shown in FIG. 4.

Figure 4:
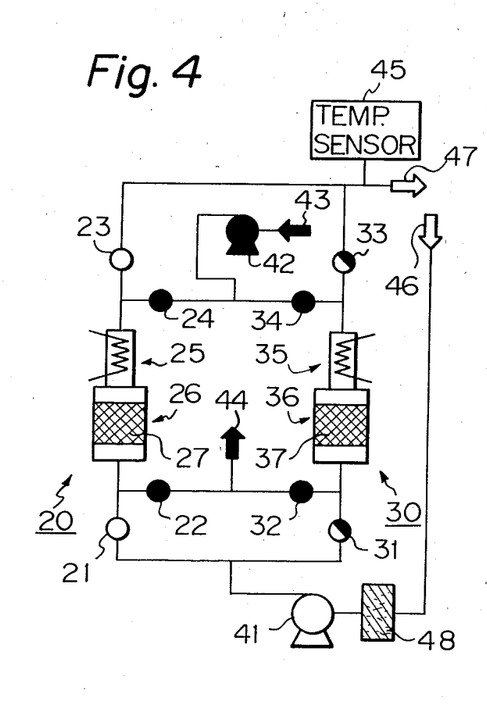

FIG. 4 illustrates another operating condition of the demoisturizing and heating apparatus, in which the adsorbing treatment unit 20 is still engaged in the adsorbing treatment of the drying air returning from the drying hopper, while the adsorbing treatment unit 30 is subjected to cooling treatment.

Referring to FIG. 4, the automatically operated valves 32 and 34 take the closed positions, while the automatically operated valves 31 and 33 take the partly open positions. Therefore, a minor part of the drying air coming from the blower 41 is permitted to flow into the adsorbing treatment unit 30 via the valve 31. The drying air that flows into the adsorbing treatment unit 20 accordingly is reduced by an amount corresponding to the minor part of the drying air. The heater 35 is deenergized.

The minor part of the drying air that flows into the adsorbing treatment unit 30 cools the adsorbing column 36, which has become hot due to the desorbing treatment, as well as the heater 35. That is, the minor part of the drying air collects sensible heat remaining in the adsorbing column 36 and the heater 35 after the desorbing treatment and, subsequently, via the valve 33, flows into and is mixed with the demoisturized and heated air circulated from the adsorbing treatment unit 20 at the upstream side of the temperature sensor 45. The above-mentioned sensible heat collected by the minor part of the drying air contributes to a rise in the temperature of the demoisturized and heated drying air from the unit 20. Therefore, the temperature sensor 45 immediately detects the rise in the temperature of the drying air to be supplied into the drying hopper via the supply port 47 and controls the thermal output of the heater 25.

It will here be understood that since the drying air coming from the blower 41 is at a rather low temperature, the cooling of the adsorbing treatment unit 30 having been subjected to the desorbing treatment is successfully achieved by the utilization of the minor part of the drying air circulated from the drying hopper. In this connection, experiments conducted by the present inventor technically confirmed that the utilization of a part of the drying air can contribute both to cooling of the adsorbing treatment units 20 or 30 after the desorbing treatment and to acquiring a stable drying faculty of the drying air for drying diverse kinds of synthetic plastic material.

The cooling treatment of the adsorbing treatment unit 30 lasts until the temperature of the cooling air sensed at the exit of the adsorbing column 36 or the heater 35 falls below a predetermined value, for example, a temperature between 120° C. and 80° C. That is, when the predetermined temperature is sensed by an appropriate temperature sensor (not shown) disposed at the exit of the adsorbing column 36 or the heater 35, the cooling treatment is terminated by changing over the valves 31 and 33 from their partly open positions, as shown in FIG. 4, to their closed positions. Alternatively, the termination of the cooling treatment may be determined by an appropriate timer device, such as a conventional electric timer.

It should here be noted that the desorbing and cooling treatments of the adsorbing treatment unit 30 described above must be completed in a period of time not greater than a time period during which the adsorbing treatment unit 20 undertakes the adsorbing treatment of the drying air coming back from the drying hopper, in order to prevent interruption of the supply of the demoisturized and heated drying air to the synthetic plastic material held in the drying hopper.

After completion of cooling of the adsorbing treatment unit 30, the automatically operated valves 31 and 33 are further changed over to their fully open positions. The adsorbing treatment unit 30 may start to undertake the adsorbing treatment of the drying air. On the other hand, with the adsorbing treatment unit 20, the automatically operated valves 21 and 23 are turned to their closed positions, while the automatically operated valves 22 and 24 are fully opened. Further, the blower 42 is started, and the heater 25 is placed in operation at its rated power. The adsorbing treatment unit 20 is now switched and subjected to the desorbing treatment operation.

Figure 5:
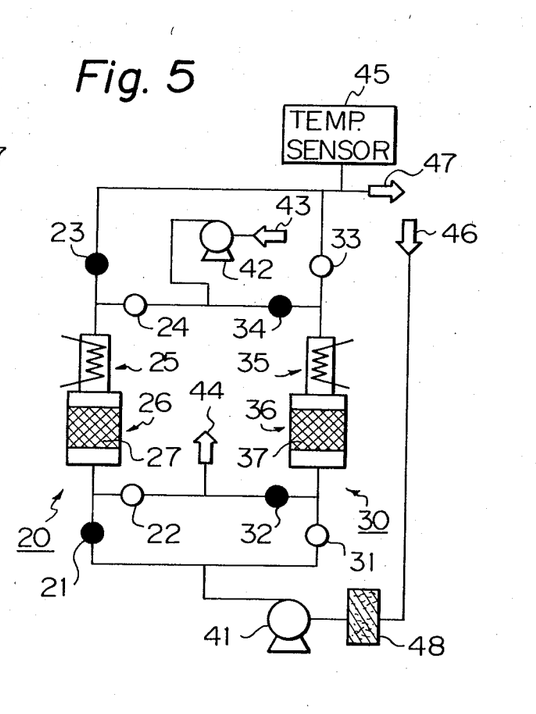

The above-mentioned switching-over of the operating conditions of both adsorbing treatment units 20 and 30 is illustrated in FIG. 5. It will be understood that the adsorbing treatment operation of the unit 30 and the desorbing and cooling treatment operations of the unit 20 are carried out in a similar way, as described with reference to FIGS. 3 and 4. The switching over of the operating conditions of both units 20 and 30 is repeated so that the demoisturized and heated drying air may always be circulated through the synthetic plastic material held in the drying hopper.

From the foregoing, it should be understood that in accordance with the present invention, the cooling treatment of either unit 20 or 30 is achieved by the use of a part of the drying air and not by the conventional air introduced from the atmosphere. Although some degree of moisture is contained in the part of the drying air, the moisture can be adsorbed during the cooling treatment operation by the unit cooled by the part of the drying air per se. In addition, since the part of the drying air is combined with the major part of the drying air, no drying air is wasted. Attention should be paid to the fact that, in the present invention, no moisture is brought into the apparatus from the atmosphere during each operating condition.

It should also be understood that, in accordance with the present invention, the high-temperature desorbing air flows through each unit 20 or 30 in a direction reverse to that in which the drying air flows. This fact is effective for providing a gradual increase in the adsorbing faculty for each of the adsorbing columns 26 and 36 when the two columns 26 and 36 alternatively undertake the adsorbing treatment of the drying air returning from the drying hopper.

In the embodiment described above with reference to FIGS. 2 through 5, each adsorbing unit 20 or 30 is provided with four automatically operated valves 21 through 24 or 31 through 34. The present inventor, however, has succeeded in designing a three-way valve that can take the place of the two automatically operated valves.

Figure 6A:
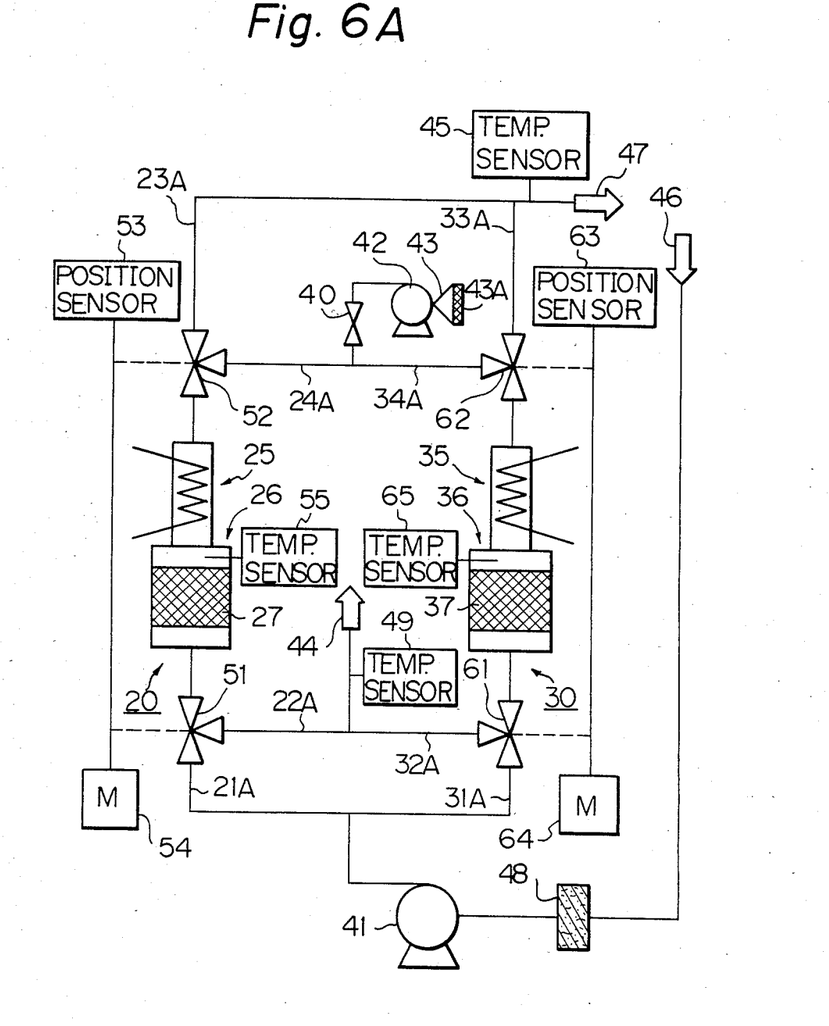
FIG. 6A is a diagrammatic view of an apparatus for demoisturizing and heating drying air for drying synthetic plastic material according to another embodiment of the present invention.

FIG. 6A illustrates another embodiment of the present invention, in which the above-mentioned three-way valves are incorporated so as to simplify the valve arrangement. In FIG. 6A, the same reference numerals as those in FIGS. 2 through 5 designate the same or like elements or units.

Referring to FIG. 6A, some of the air circuits are designated by reference numerals 21A through 24A and 31A through 34A for convenience. A manually operated valve 40 is disposed on the side of the outlet of the blower 42 for manually adjusting the amount of flow of air introduced from the atmosphere. A filter 43A is disposed aside the air inlet 43. A temperature sensor 49 is provided for detecting the temperature of the desorbing air discharged into the atmosphere via the air outlet 44. Three-way valves 51 and 52 are accommodated in the adsorbing treatment unit 20, while three-way valves 61 and 62 are accommodated in the adsorbing treatment unit 30. The former two valves 51 and 52 are mechanically interconnected with one another, as shown by broken lines, so that the two valves 51 and 52 are commonly driven by a single geared motor 54. A position sensor 53 is provided for detecting valve positions of the two three-way valves 51 and 52. Similarly, the latter two valves 61 and 62 are commonly driven by a single geared motor 64, and a position sensor 63 is provided for detecting valve positions of the two valves 51 and 52. Temperature sensors 55 and 65 are provided for detecting the temperature prevailing in the two adsorbing columns 26 and 36, respectively.

For brevity, the construction and operation of the embodiment of FIG. 6A will be described primarily as to the differences from those of the previous embodiment of FIGS. 2 through 5.

The heaters 25 and 35 are electrically powered heaters. The adsorbent 27 and 37 filling respective adsorbing columns 26 and 36 are preferably regenerable synthetic zeolite. The temperature sensors 55 and 65 are preferably of the type of a temperature sensor having a temperature indicator, respectively, for monitoring the operating condition of the units 20 and 30. That is, when each of the units 20 and 30 is subjected to the desorbing treatment operation, the temperature of the desorbing air sucked by the blower 42 and heated by the heater 25 or 35 can be monitored at the exit of the heater 25 or 35. As a result, the manually operated valve 40 can be adjusted by an operator so as to regulate the amount of the desorbing air thereby setting a suitable air temperature at the exit of the heater 25 or 35.

On the other hand, when each of the columns 26 and 36 is subjected to the cooling treatment operation, the change in the temperature of the cooling air, i.e., a minor part of the drying air, can be monitored by the temperature sensor 55 or 65. As a result, the time period necessary for cooling the column 26 or 36 can be adjusted through the adjustment of a timer device (not shown).

The temperature sensor 49 is used for issuing a signal indicating that the temperature of the desorbing purpose air reaches a predetermined value. The signal is then used for terminating the desorbing treatment operation. Therefore, the temperature sensor 49 is preferably of the type having a thermal switch element therein.

With the two three-way valves 51 and 52 driven by the geared motor 54, the position sensor 53, which may comprise, for example, microswitches, issues signals indicating first through fourth valve positions, the first valve position being a fully open position for completely interconnecting the circuits 22A and 24A with one another through the adsorbing column 26 and the heater 25, the second valve position being another fully open position for completely interconnecting the circuits 21A and 23A with one another through the adsorbing column 26 and the heater 25, the third valve position being a partly open position for partly interconnecting the circuits 21A and 23A with one another through the adsorbing column 26 and the heater 25, and the fourth valve position being a closed position for closing all circuits 21A through 24A. The signals issued by the position sensor 53 are used for controlling the rotation of the geared motor 54 in such a manner that the two three-way valves 51 and 52 can take one of the four valve positions depending on the operating conditions of the adsorbing treatment unit 20.

The foregoing discussion of the two three-way valves 51 and 52 is also applicable also to the two three-way valves 61 and 62 of the adsorbing treatment unit 30.

It should be noted that the above-mentioned fourth position taken by the combination of the two valves 51 and 52 or of the other two valves 61 and 62 enables to close both the inlet and outlet of the adsorbing column 26 or 36 when the operation of the entire apparatus is stopped. As a result, it is possible to isolate the adsorbing treatment units 20 and 30 from moisture when the apparatus does not run.

In the case where the regenerating treatment operation consisting of the desorbing treatment and cooling treatment is completed in a period of time shorter than the adsorbing treatment operation, the above-mentioned fourth position of the valves is effective for closing both the inlet and outlet of each adsorbing column 26 or 36 after the completion of the regenerating treatment operation until the associated adsorbing treatment operation is completed. As a result, it is always possible to stably maintain the regenerated state of each of the adsorbing columns 26 and 36.

Figure 6B:
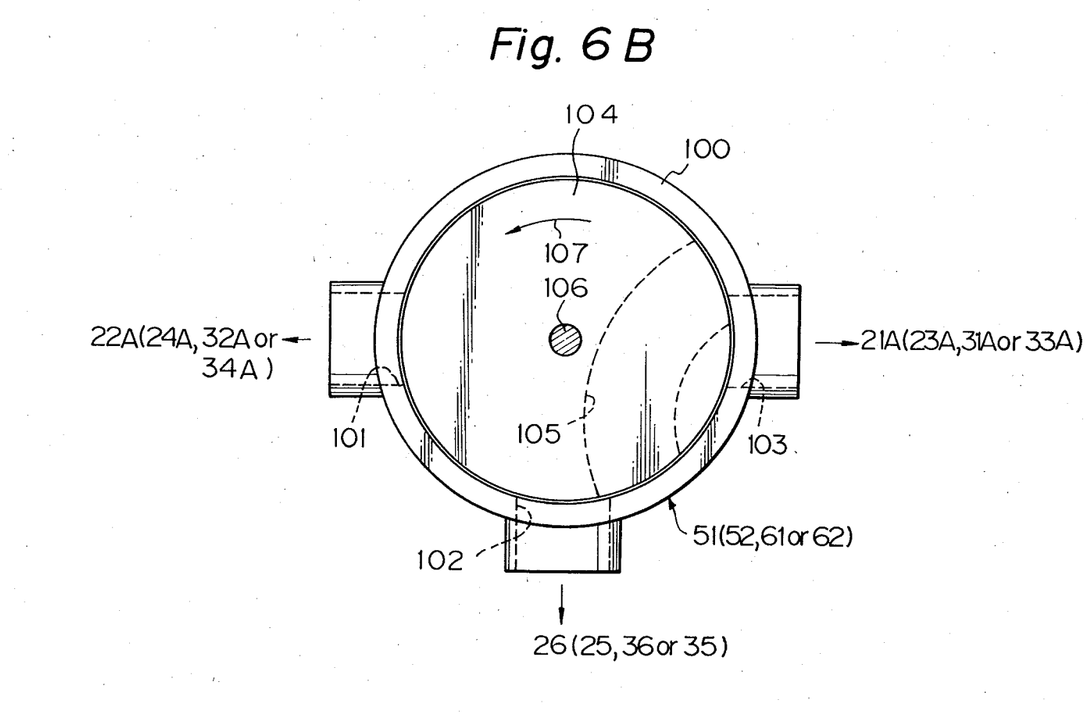
FIG. 6B is a plan view of an example of a three-way valve suited for incorporation in the apparatus of FIG. 6A.

FIG. 6B diagrammatically illustrates an example of the mechanical construction of the three-way valve 51, 52, 61, or 62. The illustrated valve includes a fixedly arranged cylindrical valve barrel 100 having three ports 101 through 103 and a rotatable valve plate 104 having therein a valve passageway 105. The ports 101 through 103 of the valve barrel 100 are respectively communicated with air circuits as shown in FIG. 6B. The rotatable valve plate 104 is provided with a shaft 106 extending vertically to the valve plate 104. The shaft 106 is mechanically connected to a drive motor, such as the geared motor 54 or 64.

With the above-described construction of the three-way valve 51, 52, 61, or 62, the rotation of the valve plate 104 enables the afore-mentioned first through fourth positions. That is, when the valve plate 104 is rotated in the direction as shown by an arrow 107, the valve passageway 105 of the valve plate 104 can be positioned in order at the first position where the ports 101 and 102 are communicated with one another, the second position where the ports 102 and 103 are communicated with one another, the third position where the ports 102 and 103 are partly communicated with one another, and the fourth position where no communication among the ports 101 through 103 is established. FIG. 6B illustrates the case where the ports 102 and 103 are partly communicated with one another by way of the valve passageway 105.

Figure 6C:
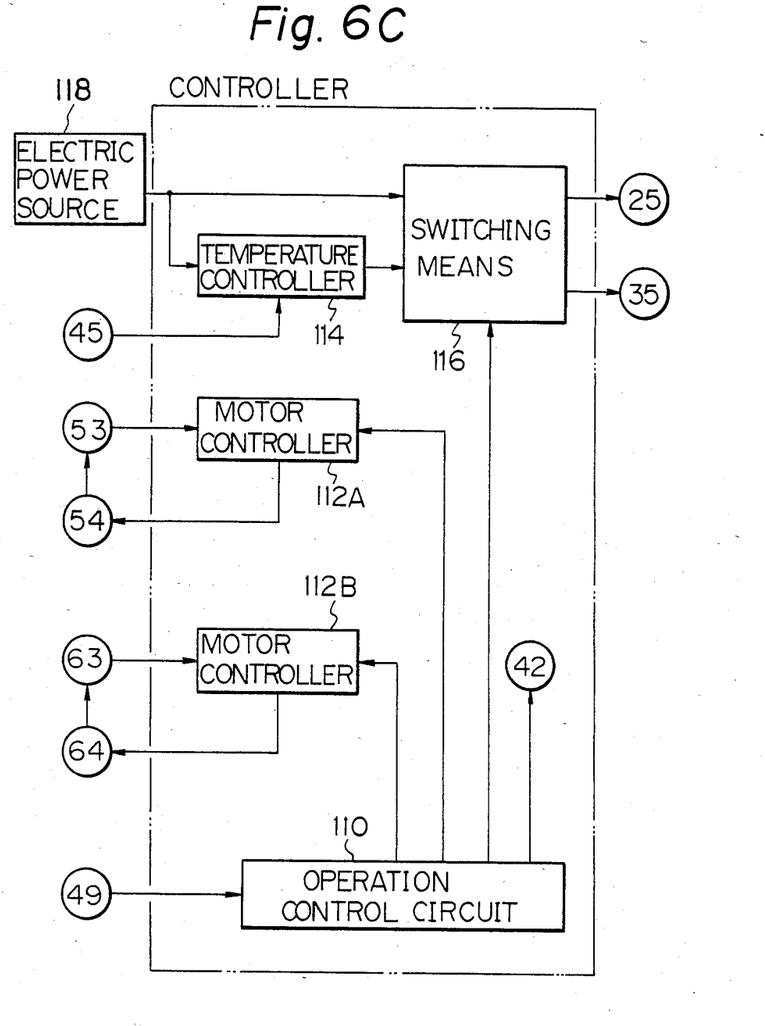
FIG. 6C is a schematic block diagram of an example of a controller suited for incorporation into the apparatus of FIG. 6A.

FIG. 6C is a block diagram of an example of a controller for controlling the operation of the embodiment of FIG. 6A. In FIG. 6C, an operation control circuit 110 is provided for controlling the operation timing of all elements and units in the apparatus. Therefore, the operation control circuit 110 may be constructed by including therein electric timer devices. Alternatively, the operation control circuit 110 may be a programmed control circuit incorporating therein a commercially available microprocessor unit. The controller also includes two motor controllers 112A and 112B both connected to the operation control circuit 110. The motor controllers 112A and 112B are provided for controlling the drive motors (geared motors) 54 and 64. Control of the drive motors 54 and 64 is carried out in accordance with the operation timing signal sent from the operation control circuit 110 and in accordance with the signals of the position sensors 53 and 63 which indicate the valve positions of the three-way valves 51, 52, 61, and 62.

A temperature controller 114 and a switching means 116 are provided for controlling the heaters 25 and 35.

The temperature controller 114 controls the output of each of the heaters 25 and 35 when each of the heaters 25 and 35 is used for heating the demoisturized drying air during the adsorbing treatment operation of each of the units 20 and 30 (FIG. 6A). Therefore, the temperature controller 114 may preferably include a conventional electric or electronic temperature controller controlling the heaters 25 and 35 consisting of electric heaters in accordance with a temperature signal detected by the temperature sensor 45.

When each of the heaters 25 and 35 is used for generating high-temperature desorbing air during the desorbing treatment operation of each of the units 20 and 30, each of the heaters 25 and 35 is operated by an electric power source 118 at its rated output. Temperature signals of the temperature sensor 49 may be used for controlling the turning-off timing of the heaters 25 and 35, via the operation control circuit 110 and the switching means 116 when each of the heaters 25 and 35 is operated so as to heat up the desorbing air. The same temperature signals of the temperature sensor 49 may also be used for controlling the termination of the desorbing treatment operation.

The operation control circuit 110 also controls the operation timing of the blower 42 that is used for sucking desorbing air from the atmosphere.

In the above-described embodiment of FIGS. 6A through 6C, the adsorbing treatment units 20 and 30 each employ two three-way valves 51, 52 and 61, 62 driven by the respective drive motors 54 and 64. The present inventor has further constructed the two three-way valves as a single valve assembly driven directly by a single geared motor.

Figure 7:
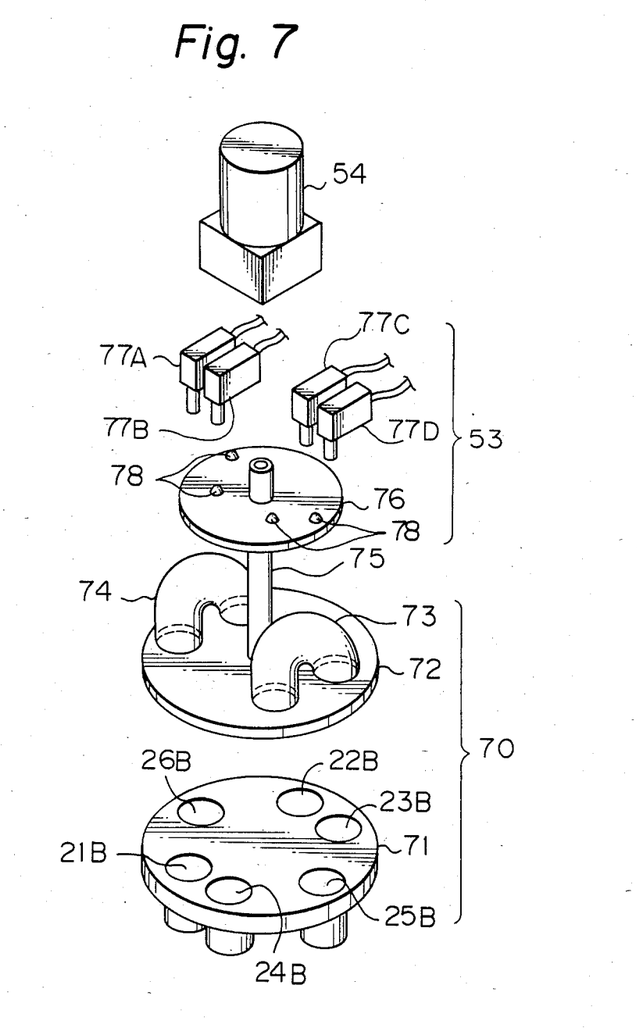
FIG. 7 is an exploded perspective view of another example of an automatically operated valve suited for incorporation into the apparatus of FIG. 6A.

FIG. 7 illustrates such a single valve assembly to be accommodated in the demoisturizing and heating apparatus of the present invention.

Referring to FIG. 7, a single valve assembly is generally indicated by reference numeral 70 and includes a stationary disc 71 and a rotatable disc 72. The rotatable disc 72 is connected to a geared motor 54 by means of a shaft 75 on which a plate 76 of a position sensor 53 is mounted so as to be rotated together with the rotatable disc 72. The plate 76 is provided with four dogs 78 disposed at four positions corresponding to the aforementioned four-valve positions. Microswitches 77A, 77B, 77C, and 77D are arranged so as to cooperate with the four dogs 78 and issue signals indicating the four valve positions. Since the valve assembly 70 functions as two three-way valves, the stationary disc 71 is formed with through-holes 21B through 26B, which are appropriately connected to circuits 21A through 24A, the heater 25, and the adsorbing column 26, on the side opposite to the rotatable disc 72. The rotatable disc 72 has two hollow elbows 73 and 74 able to work as connecting passageways to fluidly connect any two of the through-holes 21B through 26B, as described later. It should be noted that when the geared motor 54, the position sensor 53, and the single valve assembly 70 are assembled together, a compact valve unit capable of being located in a small mounting space is obtained.

Figure 8:
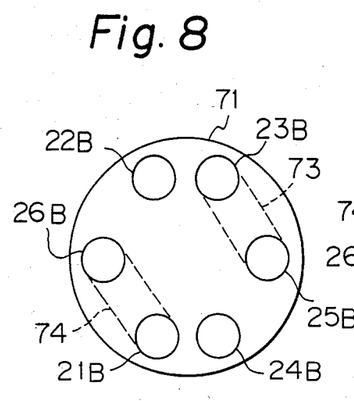
FIGS. 8 through 11 are diagrammatic views illustrating the operation of the automatically operated valve of FIG. 7.
Figure 9:
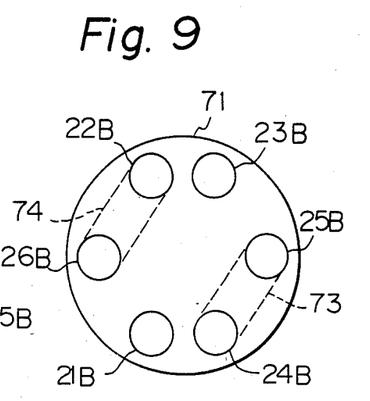
Figure 10:
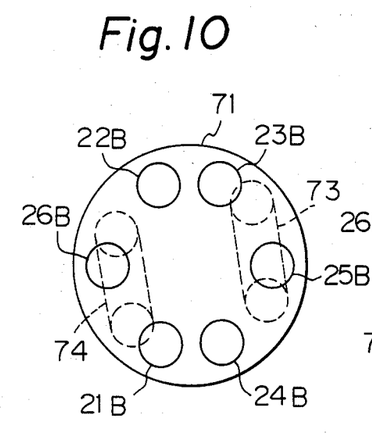
Figure 11:
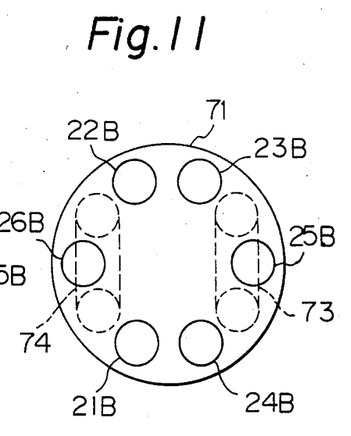

The operation of the single valve assembly 70 is diagrammatically illustrated in FIGS. 8 through 11. That is, FIGS. 8 through 11 respectively indicate the relationship between the elbows 73 and 74 of the rotatable disc 72 and the through-holes 21B through 26B of the stationary disc 71 in connection with the aforementioned four valve positions. FIG. 8 indicates the valve position for the adsorbing treatment operation; FIG. 9 that for desorbing treatment operation; FIG. 10 that for the cooling treatment operation; and FIG. 11 that to close all circuits 21A through 24A (FIG. 6A). As required, the through holes 21B, 23B, 25B, and 26B, which are used for establishing the partly open valve position as shown in FIG. 10, may be formed with a suitable recess or groove to improve the function of the partly open position of the valve assembly 70.

FIGS. 12 through 15 illustrate four modified embodiments of the present invention.

Figure 12:
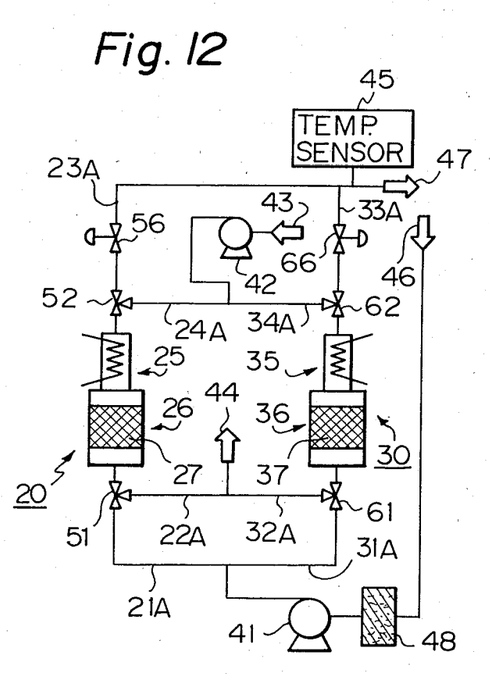
FIGS. 12 through 15 are diagrammatic views of the apparatus according to further embodiments of the present invention.

In the embodiment of FIG. 12, there are additionally provided two automatically operated valves 56 and 66 located in the circuits 23A and 33A, respectively, in comparison with the embodiment of FIG. 6A. These two valves 56 and 66 are arranged so as to establish a state where a minor part of the drying air coming back from the drying hopper via the blower 41 is permitted through each of the adsorbing treatment units 20 and 30 when each unit 20 or 30 is in the cooling treatment operation. Accordingly, the three-way valves 51, 52, 61, and 62 do not have to take the partly open position. It will, of course, be understood that when each of the two automatically operated valves 56 and 66 is opened, the associated three-way valves 51, 52 or 61, 62 must be opened together. The location of the two automatically operated valves 56 and 66 is not limited to that shown in FIG. 12. For example, the valve 56 may be located in the circuit 21A, between the three-way valve 51 and the adsorbing column 26 or between the heater 25 and the three-way valve 52, as required.

Figure 13:
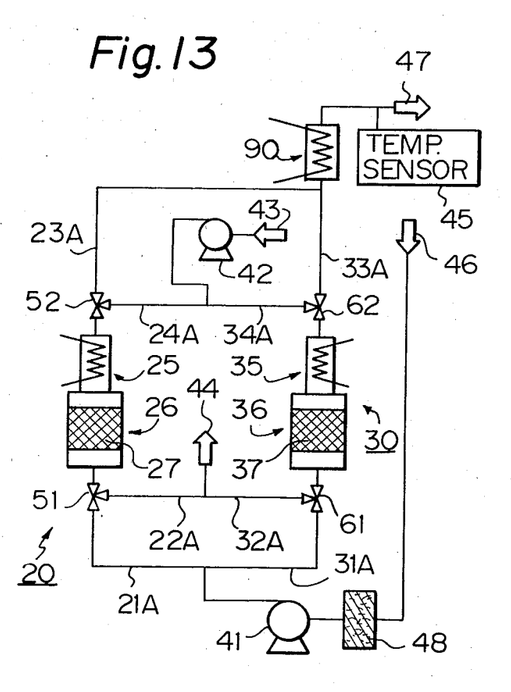

In the embodiment of FIG. 13, there is provided an additional heater 90 as compared with the embodiment of FIG. 6A. The additional heater 90 is used as a supplementary heater for heating the demoisturized drying air at the entrance of the drying hopper. This embodiment of FIG. 13 may be advantageously applied to a case where the synthetic plastic material held by the drying hopper is less moisturized. This is because, in such a case, a less amount of synthetic zeolite, i.e., the adsorbent 27 and 37, is filled in the adsorbing columns 26 and 36 from an economical point of view. As a result, lower power heaters 25 and 35 are sufficient for obtaining the heated desorbing air. However, such lower power heaters 25 and 35 are insufficient for heating the demoisturized drying air to a requisite high temperature. Accordingly, the additional heater 90 is used for supplementing the heaters 25 and 35.

In the embodiment of FIG. 13, only the additional heater 90 may be used for heating the demoisturized drying air, and the two remaining heaters 25 and 35 may exclusively be used for heating the desorbing air.

Figure 14:
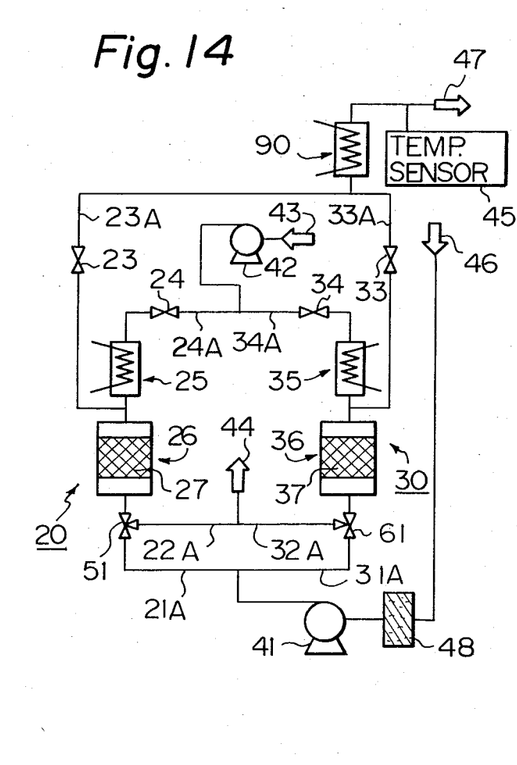

In the embodiment of FIG. 14, the two heaters 25 and 35 are exclusively used for heating the desorbing air, while the heater 90 is used for the drying air. Two-way valves 23 and 33 located in the circuits 23A and 33A and other two-way valves 24 and 34 located in the circuits 24 and 34A are provided for preventing the drying air from flowing through the heaters 25 and 35. That is, for example, when the two-way valve 23 is opened and when the two-way valve 24 is closed, the drying air having passed through the adsorbing column 26 always flows through the circuit 23A via the opened valve 23.

Figure 15:
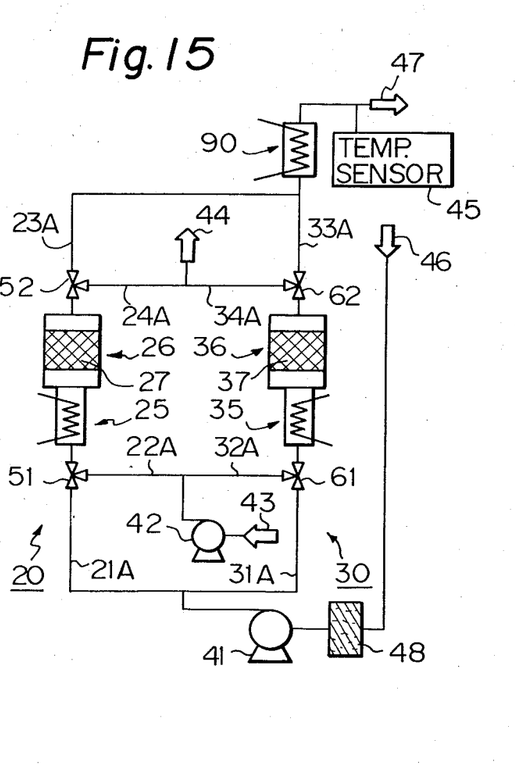

The embodiment of FIG. 15 is constructed so that the desorbing air is blown through the units 20 and 30 in the same direction as the drying air. Accordingly, the location of the two heaters 25 and 35 is different from the foregoing embodiments. The heaters 25 and 35 are exclusively operated for heating the desorbing air sucked by the blower 42, while the heater 90 is operated so as to heat up the drying air. In this embodiment, the collection of heat by the use of a part of the drying air is still achieved.

From the foregoing description, it will be understood that, in accordance with the present invention, a part of the drying air is circulated for cooling each of the two adsorbing treatment units after the desorbing treatment operation of each unit. Therefore, collection of sensible heat prevailing in the adsorbing column after the desorbing treatment operation is achieved. Accordingly, reduction of the heat energy necessary for drying synthetic plastic material can be accomplished.

Further, the use of a part of the drying air for cooling treatment of the adsorbing treatment unit can contribute to enhancing the adsorbing faculty of the adsorbent. This is because no introduction of moisture from the atmosphere takes place during the cooling treatment of each of the two adsorbing treatment units. This advantage means the possibility of reduction in the amount of the adsorbent resulting in reduction of the cost for drying synthetic plastic material. Further, in accordance with the present invention, a high quality of drying air is stably obtained. As a result, drying of synthetic plastic material can be economically achieved at a high quality.

It should be understood that various changes and modifications may be made without departing from the spirit and the scope of the present invention. For example, the heaters employed by the present invention may be a steam type or a fuel combustion type instead of the described electric heater. The drive motor for moving the three-way valves may be replaced by a conventional actuator employing pressurized air and pressure oil. The position sensors of the three-way valves may be commercially available rotary encoders, photoelectric sensors, or ultrasonic sensors instead of the described microswitches. Further, if necessary, it will be possible to change the extent of opening of the partly opened valve on the basis of signals from the position sensors. Alternatively, it may be possible to change the extent of opening of the partly opened valve in accordance with the temperature of the drying air detected at the entrance of the drying hopper. The adsorbent is not limited to the described synthetic zeolite. Other regenerable adsorbents, such as activated alumina and silica gel, may alternatively be used.

I claim:

1. A method of demoisturizing and heating drying air to be circulated for drying synthetic plastic material held in a supply container, such as a drying hopper, comprising in combination the steps of:
    arranging two separated adsorbing treatment means, each means having a moisture adsorbing column filled with adsorbent;
    connecting alternatively one of the two separate adsorbing treatment means to the supply container for a first predetermined period of time;
    circulating the drying air through said supply container and the moisture adsorbing column of said one of the two separate adsorbing treatment means for said first predetermined period of time, so that the drying air which has demoisturized the synthetic plastic material is subjected to adsorption treatment by said moisture adsorbing column;
    passing heated air through the other of the two separate adsorbing treatment means for a second predetermined period of time shorter than said first predetermined period of tiem during the above-mentioned circulating step so as to desorb moisture from the moisture adsorbing column of said other of the two separate adsorbing treatment means;

passing subsequently a part of said drying air, which has passed through said supply container and has demoisturized the synthetic plastic material, through the other of the two separate adsorbing treatment means for a third predetermined period of time prior to completion of the above-mentioned circulating step and after the above-mentioned passing step of the heated air, so that said moisture adsorbing column of said other adsorbing treatment means is cooled by said part of said drying air; and mixing said part of said drying air which has passed through said other adsorbing treatment means with said drying air which has been subjected to adsorption treatment by said moisture adsorbing column of said one of said two separate adsorbing treatment means.

2. The method as set forth in claim 1, wherein said heated air is always passed through each of the two separate adsorbing treatment means in a direction reverse to that in which said drying air is passed through said each of the two separate adsorbing treatment means.

3. The method as set forth in claim 1, wherein said passing step of said part of said drying air through said other of the two separate adsorbing treatment means is started after completion of said passing step of said heated air through said other of the two separate adsorbing treatment means.

4. The method as set forth in claim 1, wherein temperature of said drying air is constantly monitored and detected prior to entering said supply container.

5. The method as set forth in claim 1, wherein said heated air is dissipated into the atmosphere after passing through the other of the two separate adsorbing treatment means.

6. An apparatus for demoisturizing and heating drying air to be circulated for drying synthetic plastic material held in a drying hopper with an air inlet and outlet comprising, in combination:

first adsorbing treatment means including a first fixed adsorbing column filled with adsorbent and first heating means;

second adsorbing treatment means including a second fixed adsorbing column filled with adsorbent and second heating means;

first blower means connected to the air outlet of said drying hopper for promoting said drying air to be discharged from said drying hopper and to flow toward said first and second adsorbing treatment means in a first direction;

second blower means connectable to one of said first and second adosrbing treatment means for supplying air from atmostphere to one of said first and second adsorbing treatment means;

first valve means capable of taking first through third positions in a cyclic sequence, said first position permitting said drying air from said first blower means to be circulated to the air inlet of said drying hopper through said first adsorbing treatment means in which said drying air is demoisturized by said first adsorbing column and heated by said first heating means, said second position permitting said air from said second blower means to pass through said first adsorbing treatment means while desorbing moisture from said first adosrbing column, and said third position permitting a part of said drying air from said first blower means to be circulated toward said air inlet of said drying hopper through said first adsorbing treatment means while cooling said first adsorbing column and said first heating means;

second valve means capable of taking first through third positions in a cyclic sequence, said first position permitting said drying air from said frist blower means to be circulated to said air inlet of said drying hopper through said second adsorbing treatment means in which said drying air is demoisturized by said second adsorbing column and heated by said second heating means, said second position permitting said air from said second blower means to pass through said second adsorbing treatment means while desorbing moisture from said second adsorbing column, and said third position permitting a part of said drying air from said first blower means to be circulated toward said air inlet of said drying hopper through said second adsorbing treatment means while cooling said second adsorbing column and said second heating means; and means for controlling the operation sequence of said first and second valve means in such a manner that while one of said first and second valve means is taking said first position thereof, the other of said first and second valve means takes said second and third position in succession.

7. The apparatus as set forth in claim 6, wherein said first valve means comprises at least one three-way valve disposed between said first blower means and said air inlet of said drying hopper, said three-way valve being able to take a position operating as said third position of said first valve means, and wherein said second valve means comprises at least one three-way valve disposed between said first blower means and said second adsorbing treatment means, said three-way valve being able to take a position operating as said third position of said second valve means.

8. The apparatus as set forth in claim 6, wherein said first valve means comprises a first three-way valve between said first blower means and said first adsorbing treatment means and a second three-way valve between said first adsorbing treatment means and said air inlet of said drying hopper, said first and second three-way valves being able to simultaneously take respective positions operating as said third position of said first valve means, and wherein said second valve means comprises a first three-way valve between said first blower means and said second adsorbing treatment means and a second three-way valve between said second adsorbing treatment means and said air inlet of said drying hopper, said first and second three-way valves being able to simultaneously take respective positions operating as said third position of said second valve means.

9. The apparatus as set forth in claim 8, wherein said first and second three-way valves of said first valve means are formed in a single valve assembly having a single drive means and wherein said first and second three-way valves of said second valve means are formed in another single valve assembly having a single drive means.

10. The apparatus as set forth in claim 9, wherein each of said two single valve assemblies comprises a fixed port defining plate, a rotatable valve plate cooperable with said fixed port defining plate, a position-indicating plate rotatable with said rotatable valve plate, and position detecting means cooperable with said position-indicating plate for controlling said single drive means.

11. The apparatus as set forth in claim 8, wherein said first and second three-way valves of said first valve means are mechanically interconnected with one another, and said first valve means further comprises a single drive means for commonly operating both said first and second three-way valves so as to take said first through third positions; and wherein said first and second three-way valves of said second valve means are mechanically interconnected with one another and said second valve means further comprises a single drive means for commonly operating both said first and second three-way valves so as to take said first through third positions.

12. The apparatus as claimed in claim 6, wherein said first and second heating means of said first and second adsorbing treatment means are used for heating said drying air demoisturized by said first and second adsorbing columns to a first preselected temperature suited for drying said synthetic plastic material, respectively, and for heating said air from said second blower means to a second preselected temperature suited for desorbing moisture from said first and second adsorbing columns, respectively.

13. The apparatus as claimed in claim 12, further comprising a first temperature-sensing means for detecting a temperature of said drying air prior to entering into said air inlet of said drying hopper and a second temperature sensing means for detecting a temperature of said air which has passed through one of said first and second adsorbing treatment means.

14. The apparatus as claimed in claim 12, wherein said first and second heating means comprise electrically powered heaters.

15. The apparatus as claimed in claim 6, wherein said adsorbent of said first and second adsorbing columns is synthetic zeolite.

* * * * *